United States Patent [19]
Sim

[11] Patent Number: 6,031,580
[45] Date of Patent: Feb. 29, 2000

[54] APPARATUS AND METHOD FOR AUTOMATICALLY DISPLAYING BROADCASTING PROGRAM INFORMATION IN TELEVISION RECEIVER

[75] Inventor: Soon Sun Sim, Suwon, Rep. of Korea

[73] Assignee: Samsung Electronics Co., Ltd., Rep. of Korea

[21] Appl. No.: 08/902,783

[22] Filed: Jul. 30, 1997

[30] Foreign Application Priority Data

Aug. 1, 1996 [KR] Rep. of Korea ........................ 96-32254

[51] Int. Cl.$^7$ ................................................. H04N 5/445
[52] U.S. Cl. .............................. 348/565; 348/906; 455/6.2
[58] Field of Search ...................................... 348/563, 564, 348/565, 567, 725, 731, 734, 906, 10, 6, 7, 12, 13; 455/132, 186.1, 5.1, 6.2, 4.2; H04N 7/16, 7/173

[56] References Cited

U.S. PATENT DOCUMENTS

| 5,029,007 | 7/1991 | Spiero | 358/181 |
| 5,105,183 | 4/1992 | Beckman | 340/717 |
| 5,285,284 | 2/1994 | Takashima et al. | 348/731 |
| 5,512,954 | 4/1996 | Shintani | 348/468 |
| 5,528,304 | 6/1996 | Cherrick et al. | 348/565 |
| 5,557,338 | 9/1996 | Maze et al. | 348/565 |
| 5,576,769 | 11/1996 | Lendaro | 348/511 |
| 5,708,475 | 1/1998 | Hayashi et al. | 248/468 |
| 5,729,300 | 3/1998 | Ahn | 348/564 |
| 5,734,436 | 3/1998 | Abe et al. | 348/564 |

Primary Examiner—Andrew I. Faile
Assistant Examiner—Uyen Le
Attorney, Agent, or Firm—Dilworth & Barrese

[57] ABSTRACT

An apparatus and a method for automatically displaying broadcasting program information in a television receiver which has a microcomputer for controlling the entire system operation, first and second tuners for tuning in to television broadcasting signals corresponding to selected channels under the control of the microprocessor, respectively, first and second tuner decoders for decoding the television broadcasting signals tuned by the first and second tuners, respectively, and a signal processor for processing output signals from the first and second tuner decoders to display them on main and sub cathode ray tubes, respectively. The apparatus comprises a first switch for selecting a video signal from the second tuner decoder or an external video signal in response to a first switching control signal from the microprocessor, a broadcasting program information output unit for detecting, storing and outputting broadcasting program information from the first tuner decoder in response to a program information storage/output control signal from the microprocessor, and a second switch for selecting the broadcasting program information from the broadcasting program information output unit or the video signal selected by the first switch in response to a second switching control signal from the microprocessor.

7 Claims, 2 Drawing Sheets

APPARATUS AND METHOD FOR AUTOMATICALLY DISPLAYING BROADCASTING PROGRAM INFORMATION IN TELEVISION RECEIVER

BACKGROUND OF THE INVENTION

1. Field of the Invention

The present invention relates in general to a television receiver with a double screen or a multi-screen, and more particularly to an apparatus and a method for automatically displaying broadcasting program information in the television receiver, in which, when a broadcasting program information function is selected, the broadcasting program information is automatically displayed on the screen simultaneously with a broadcasting signal so that it can be seen by a viewer while the current broadcasting is watched by the viewer.

2. Description of the Prior Art

As well known, a broadcasting station shoots a picture using a broadcasting camera and transmits the resultant television broadcasting signal by radio, and a television receiver receives the television broadcasting signal from the broadcasting station through an antenna and processes it to output an audio signal to a speaker and a video signal to a screen.

In order to know the broadcasting time schedule of programs by broadcasting stations, a television viewer has to refer to broadcasting program forecasts disclosed in entertainment columns of a daily newspaper or other magazines. For this reason, the television viewer must continuously subscribe to the newspaper or magazine and look up the broadcasting program forecast therein to know the television broadcasting program schedule.

To solve the above problem, the Korea Broadcasting Program Service (KBPS) appends guide information about a weekly broadcasting program to television broadcasting signals in Korea, so that it can be received by television receivers.

However, because a conventional television receiver has a single tuner, it is impossible to receive the broadcasting program information from the KBPS through any channel other than the current channel and display the received broadcasting program information on a screen using a broadcasting program guide function. Further, a reserve-recording function can be performed only in a special manner such as a G code manner.

SUMMARY OF THE INVENTION

Therefore, the present invention has been made in view of the above problem, and it is an object of the present invention to provide an apparatus and a method for automatically displaying broadcasting program information in a television receiver, in which, when a broadcasting program guide function is selected, the broadcasting program information from the KBPS is automatically displayed on a double screen or a multi-screen of the television receiver simultaneously with a broadcasting signal so that it can be seen by a viewer while the current broadcasting is watched by the viewer.

In accordance with one aspect of the present invention, there is provided an apparatus for automatically displaying broadcasting program information in a television receiver, the television receiver having a microcomputer for controlling the entire system operation in response to a key signal inputted by a key input unit or a remote controller, first and second tuners for tuning in to television broadcasting signals corresponding to selected channels under the control of the microprocessor, respectively, first and second tuner decoders for decoding the television broadcasting signals tuned by the first and second tuners, respectively, and a signal processor for processing output signals from the first and second tuner decoders to display them on main and sub cathode ray tubes, respectively, comprising first switching means for selecting a video signal from the second tuner decoder or an external video signal in response to a first switching control signal from the microprocessor; broadcasting program information output means for detecting, storing and outputting broadcasting program information from the first tuner decoder in response to a program information storage/output control signal from the microprocessor; and second switching means for selecting the broadcasting program information from the broadcasting program information output means or the video signal selected by the first switching means in response to a second switching control signal from the microprocessor and outputting the selected broadcasting program information or video signal to the signal processor.

In accordance with another aspect of the present invention, there is provided a method for automatically displaying broadcasting program information in a television receiver, comprising the first step of supplying power to the television receiver if power of the television receiver is turned on, checking whether a channel selection key signal is inputted and outputting a video signal of a selected channel to a main cathode ray tube through a first tuner and a first tuner decoder if it is checked that the channel selection key signal is inputted; the second step of checking whether another channel selection key signal is inputted and outputting a video signal of another channel to a sub cathode ray tube through a second tuner, a second tuner decoder and first and second switches if it is checked that another channel selection key signal is inputted; the third step of checking whether a video signal selection key signal is inputted to select an external reproduced video signal and outputting the external reproduced video signal to the sub cathode ray tube through the first and second switches if it is checked that the video signal selection key signal is inputted; and the fourth step of changing the current mode to a broadcasting program information output mode in response to a broadcasting program information output key signal, outputting stored broadcasting program information to the sub cathode ray tube and changing the current mode to a broadcasting program information release mode in response to a broadcasting program information release key signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
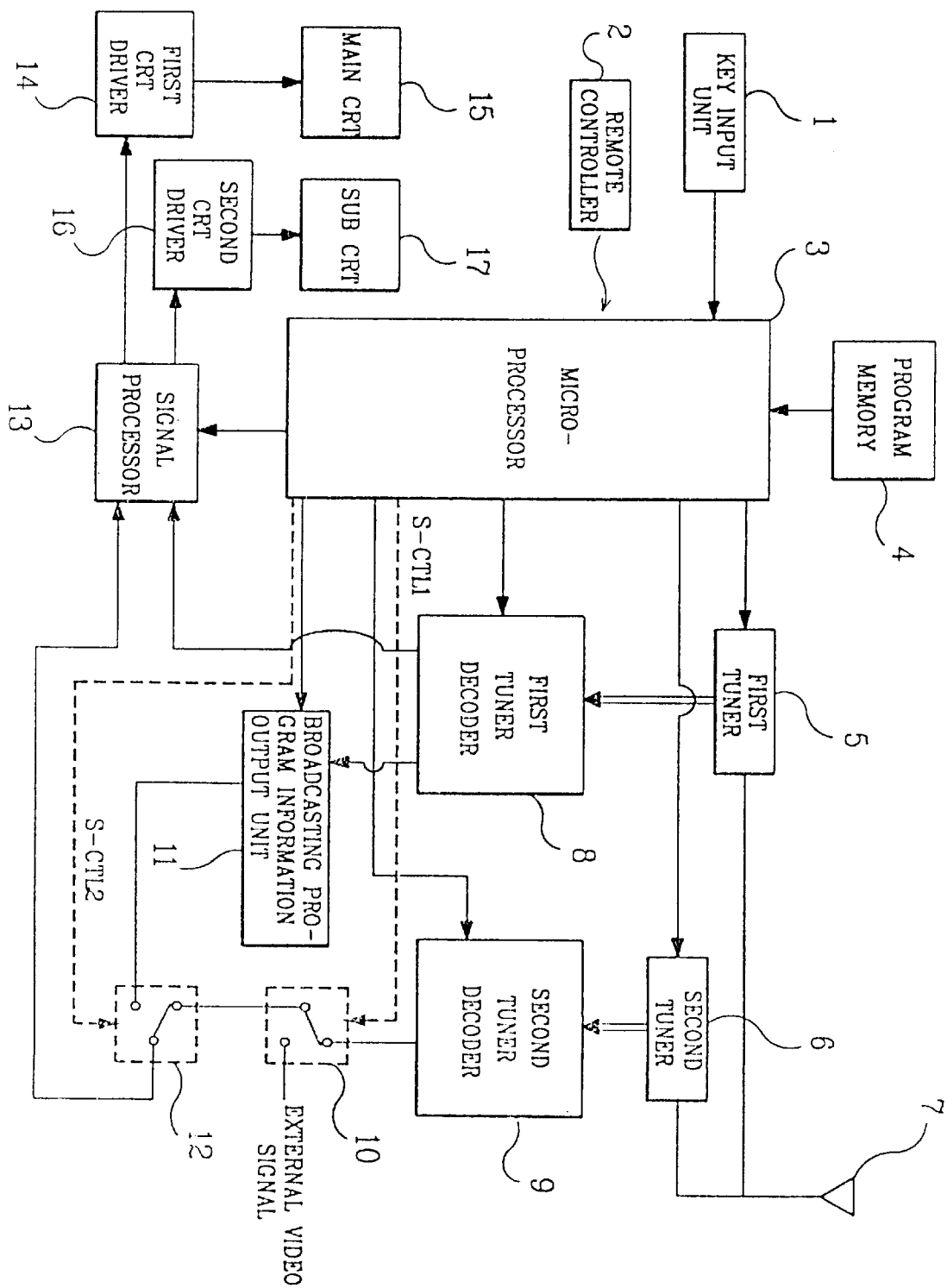
FIG. 1 is a schematic block diagram illustrating the construction of a television receiver to which the present invention is applied.

FIG. 1 is a schematic block diagram illustrating the construction of a television receiver to which the present invention is applied. In this drawing, the reference numeral 1 designates a key input unit for directly inputting a key signal according to a viewer's selection. To this end, the key input unit 1 includes a power key PWR, a channel up/down key CH, a volume up/down key VOL, a tuner selection key TUN and a broadcasting program information output selection key EPG.

The reference numeral 2 designates a remote controller for remotely inputting a key signal according to a viewer's selection. To this end, the remote controller 2 includes the power key PWR, the channel up/down key CH, the volume up/down key VOL, the tuner selection key TUN, the broadcasting program information output selection key EPG and a function selection key CTL.

The reference numeral 3 designates a microprocessor for controlling the entire system operation including channel tuning and signal processing according to an algorithm or proceeding order preset in a program memory 4 in response to the key signal inputted by the key input unit 1 or remote controller 2.

The reference numerals 5 and 6 designate first and second tuners, respectively, each of which tunes in to one of television broadcasting signals received through an antenna 7 corresponding to a channel selected by the viewer in response to a phase control signal from the microprocessor 3 for the channel tuning.

The reference numeral 8 designates a first tuner decoder for decoding the television broadcasting signal tuned by the first tuner 5, and the reference numeral 9 designates a second tuner decoder for decoding the television broadcasting signal tuned by the second tuner 6.

The reference numeral 10 designates a first switch for selecting a video signal from the second tuner decoder 9 or an external video signal in response to a first switching control signal S-CTL1 from the microprocessor 3.

The reference numeral 11 designates a broadcasting program information output unit for detecting, storing and outputting broadcasting program information from the first tuner decoder 8 in response to a program information storage/output control signal from the microprocessor 3.

The reference numeral 12 designates a second switch for selecting the broadcasting program information from the broadcasting program information output unit 11 or the video signal selected by the first switch 10 in response to a second switching control signal S-CTL2 from the microprocessor 3.

The reference numeral 13 designates a signal processor for processing an output signal from the first tuner decoder 8 or the second switch 12 to output luminance and chrominance signals.

The reference numeral 14 designates a first cathode ray tube (CRT) driver for displaying a picture on a main CRT 15 in response to the luminance and chrominance signals from the signal processor 13.

The reference numeral 16 designates a second CRT driver for displaying a picture on a sub CRT 17 in response to the luminance and chrominance signals from the signal processor 13.

In accordance with the present invention, the multi-system reception operation can be performed through the first and second tuners 5 and 6, and the signal processing of broadcasting program information from the KBPS can be performed through the first tuner decoder 8, second switch 12, signal processor 13 and first and second CRT drivers 14 and 16.

Figure 2:
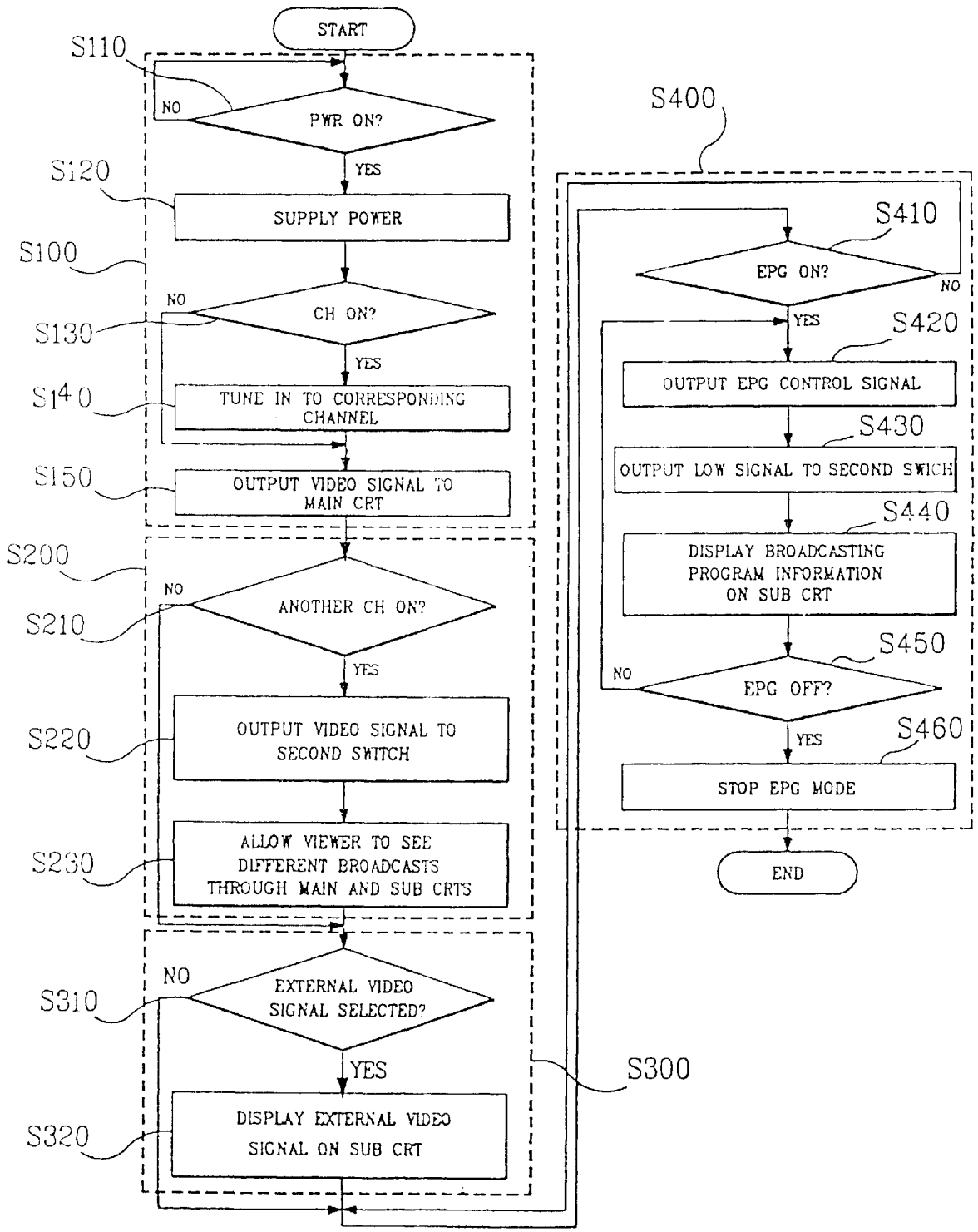
FIG. 2 is a flowchart illustrating a method for automatically displaying broadcasting program information in the television receiver in FIG. 1 in accordance with an embodiment of the present invention.

FIG. 2 is a flowchart illustrating a method for automatically displaying broadcasting program information in the television receiver in FIG. 1 in accordance with an embodiment of the present invention. First, if the power key PWR on the key input unit 1 or remote controller 2 is selected by the viewer, power of the television receiver is turned on at step S110. The microprocessor 3 recognizes the power-on state of the television receiver and controls a power supply circuit (not shown) to perform normal power supply at step S120. If the channel up/down key CH is selected by the viewer at step S130, the corresponding channel selection key signal is applied to the microprocessor 3. The microprocessor 3 recognizes a channel selected by the viewer in response to the channel selection key signal. Also, if the tuner selection key TUN is selected by the viewer, the corresponding tuner selection key signal is applied to the microprocessor 3. The microprocessor 3 recognizes the selection of the first tuner 5 in response to the tuner selection key signal.

In response to the channel selection key signal and tuner selection key signal, the microprocessor 3 outputs the phase control signal for the channel tuning to the first tuner 5 to allow the first tuner 5 to tune in to one of television broadcasting signals received through the antenna 7 corresponding to the selected channel at step S140. The tuned television broadcasting signal from the first tuner 5 is decoded by the first tuner decoder. 8 and then outputted to the main CRT 15 through the signal processor 23 and first CRT driver 14, at step S150.

The microprocessor 3 checks at step S210 whether another channel selection key signal is inputted by the viewer to allow the second tuner 6 to receive another television broadcasting signal. If another channel selection key signal is inputted at the above step S210, the microprocessor 3 outputs the first switching control signal S-CTL1 of high level to the first switch 10. As a result, the decoded television broadcasting signal from the second tuner decoder 9 is transferred to the second switch 12 through the first switch 10 at step S220.

Also, the microprocessor 3 outputs the second switching control signal S-CTL2 of high level to the second switch 12 in response to the channel selection key signal inputted at the above step S210 so that the decoded television broadcasting signal from the second tuner decoder 9 can be displayed on the sub CRT 17 through the signal processor 13 and second CRT driver 16. As a result, the television broadcasting signals of different channels on the main and sub CRTs 15 and 17 can simultaneously be seen by the viewer at step S230.

At this time, an external video signal may be reproduced by an external video recording/reproducing apparatus (not shown) and then applied to the first switch 10. The microprocessor 3 checks at step S310 whether a key signal is inputted by the viewer to output the external video signal from the external video recording/reproducing apparatus to the sub CRT 17. If the key signal is inputted at the above step S310, the microprocessor 3 outputs the first switching control signal S-CTL1 of low level to the first switch 10. As a result, the external video signal from the external video recording/reproducing apparatus is displayed on the sub CRT 17 through the first and second switches 10 and 12, signal processor 13 and second CRT driver 16 at step S320.

On the other hand, the microprocessor 3 checks at step S410 whether the broadcasting program information output selection key signal EPG is inputted by the viewer. In the case where the key signal EPG is inputted at the above step S410, the microprocessor 3 outputs the program information storage/output control signal to the broadcasting program information output unit 11 at step S420. The microprocessor 3 also outputs the second switching control signal S-CTL2 of low level to the second switch 12 at step S430. As a result, the broadcasting program information output unit 11 detects weekly broadcasting program information provided by the KBPS from the video signal, tuned by the first tuner 5 and then decoded by the first tuner decoder 8. The broadcasting program information output unit 11 then sequentially stores the detected broadcasting program information.

The broadcasting program information stored in the broadcasting program information output unit 11 is displayed on the sub CRT 17 through the second switch 12, signal processor 13 and second CRT driver 16 at step S440 so that it can be seen by the viewer.

Thereafter, in the case where a broadcasting program information output release key signal is inputted by the viewer at step S450, the microprocessor 3 stops the output of the program information storage/output control signal to the broadcasting program information output unit 11 and outputs the second switching control signal S-CTL2 of high level to the second switch 12. As a result, the broadcasting program information output function is not performed at step S460.

As apparent from the above description, the present invention provides the apparatus and method for automatically displaying the broadcasting program information in the television receiver with the double screen or multi-screen. The broadcasting signal corresponding to the channel selected by the viewer is outputted through the main CRT, and the broadcasting program information selected by the viewer is outputted through the sub CRT. Therefore, the viewer can see the broadcasting program information simultaneously with the television broadcast.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for automatically displaying broadcasting program information in a television receiver, said television receiver having a microprocessor for controlling the entire system operation in response to a key signal inputted by a key input unit or a remote controller, first and second tuners for tuning in to television broadcasting signals corresponding to selected channels under the control of said microprocessor, respectively, first and second tuner decoders for decoding the television broadcasting signals tuned by said first and second tuners, respectively, and a signal processor for processing output signals from said first and second tuner decoders to display said output signals on main and sub cathode ray tubes, respectively, comprising:

first switching means for selecting a video signal from said second tuner decoder or an external video signal in response to a first switching control signal from said microprocessor; broadcasting program information output means for detecting, storing and outputting to said sub-cathode ray tube a broadcasting program information listing from said first tuner decoder in response to a program information storage/output control signal from said microprocessor; and second switching means having an input coupled to an output of said first switching means for selecting the broadcasting program information from said broadcasting program information output means or the video signal selected by said first switching means in response to a second switching control signal from said microprocessor and outputting the selected broadcasting program information or video signal to said signal processor.

2. A method for automatically displaying broadcasting program information in a television receiver, comprising the steps of:

(a) supplying power to said television receiver if power of said television receiver is turned on, checking whether a channel selection key signal is inputted and outputting a video signal of a selected channel to a main cathode ray tube through a first tuner and a first tuner decoder if it is checked that the channel selection key signal is inputted;

(b) checking whether another channel selection key signal is inputted and outputting a video signal of another channel to a sub cathode ray tube through a second tuner, a second tuner decoder and first and second switches if it is checked that another channel selection key signal is inputted;

(c) checking whether a video signal selection key signal is inputted to select an external reproduced video signal and outputting the external reproduced video signal to said sub cathode ray tube through said first and second switches if it is checked that the video signal selection key signal is inputted; and (d) changing the current mode to a broadcasting program information output mode in response to a broadcasting program information output key signal, outputting stored broadcasting program information to said sub cathode ray tube and changing the current mode to a broadcasting program information release mode in response to a broadcasting program information release key signal.

3. A method for automatically displaying broadcasting program information in a television receiver, as set forth in claim 2, wherein said step (d) includes the steps of:

(d-1) checking whether the broadcasting program information output key signal is inputted;

(d-2) if it is checked at said step (d-1) that the broadcasting program information output key signal is inputted, outputting a broadcasting program information control signal to a broadcasting program information output unit and a switching control signal to said second switch to output the broadcasting program information to said sub cathode ray tube;

(d-3) checking whether the broadcasting program information release key signal is inputted; and (d-4) changing the current mode to the broadcasting program information release mode if it is checked at said step (d-3) that the broadcasting program information release key signal is inputted and returning to said step (d-2) if it is checked at said step (d-3) that the broadcasting program information release key signal is not inputted.

4. A television comprising:

means for simultaneously receiving and displaying a plurality of broadcast programs;

means for receiving broadcast program data and outputting said broadcast program data to a signal processor;

a signal processor for processing user inputs from an inputting device, for retrieving said broadcast program data, and for causing display of two display images comprising a first image and a second image, said second image comprising a display on a secondary display of a selected one of said plurality of broadcast programs, external video and said program data independently or simultaneously with the display of said first image which comprises one of said plurality of broadcast programs displayed upon a primary display, upon receiving a program display command input from the inputting device;

first switching means for selecting a video signal from a second tuner decoder or an external video signal in response to a first switching control signal from a microprocessor;

second switching means having an input coupled to an output of said first switching means for selecting one of broadcasting program data and an external video signal, and outputting the selected broadcasting program information or video signal to said signal processor.

5. The television of claim 4, further including a memory for storing said broadcast program data.

6. The television of claim 5, wherein said processor includes means for retrieving said program data from said memory for display upon selection of said program display unit.

7. The television of claim 4, wherein said processor displays said program data independently upon selection of said program display input and displays said program data simultaneously with a selected broadcast program upon selection of a second program display input.

* * * * *